INVENTOR.
PAUL WORKMAN
BY Howard J. Whelan
ATTORNEY

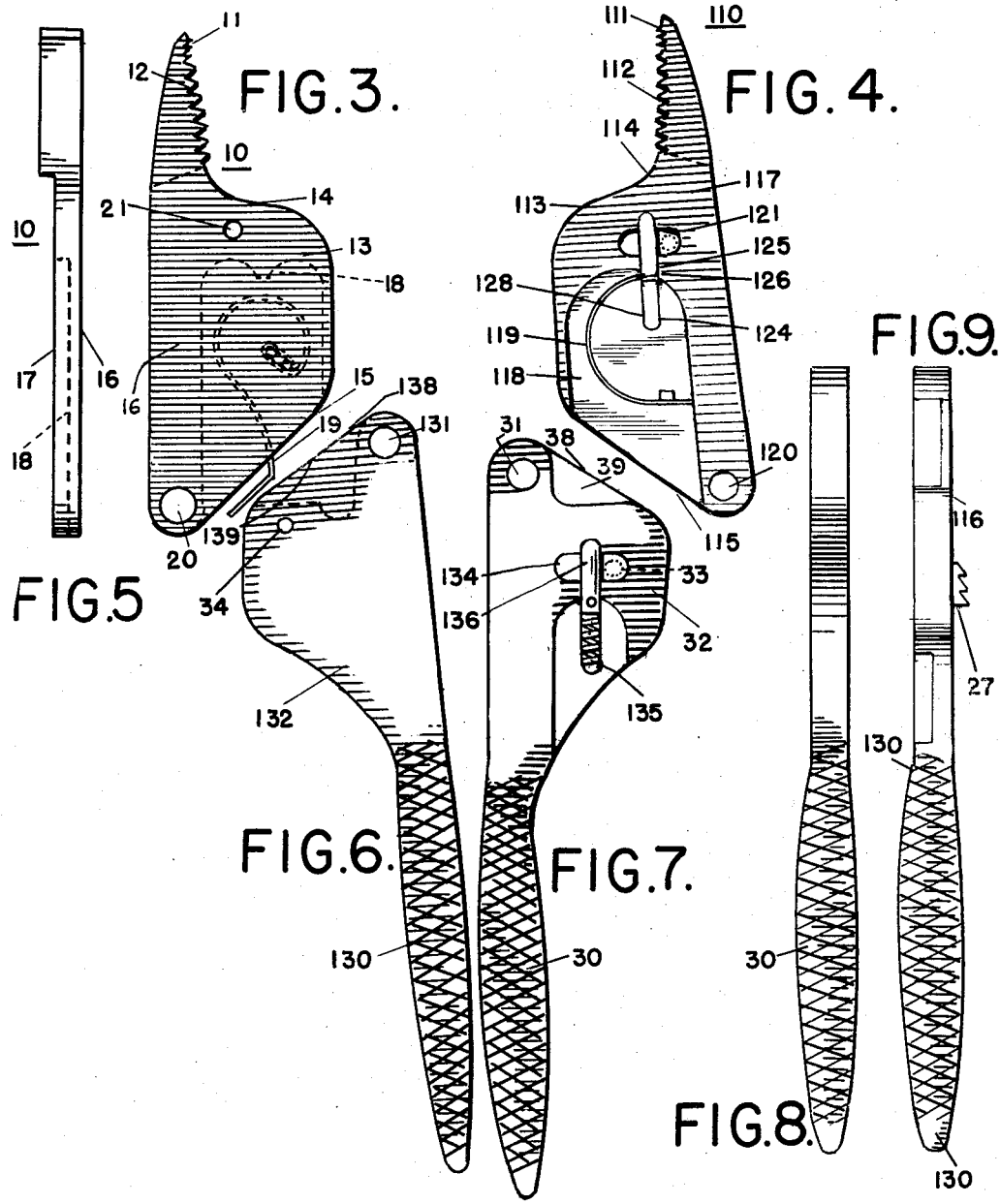

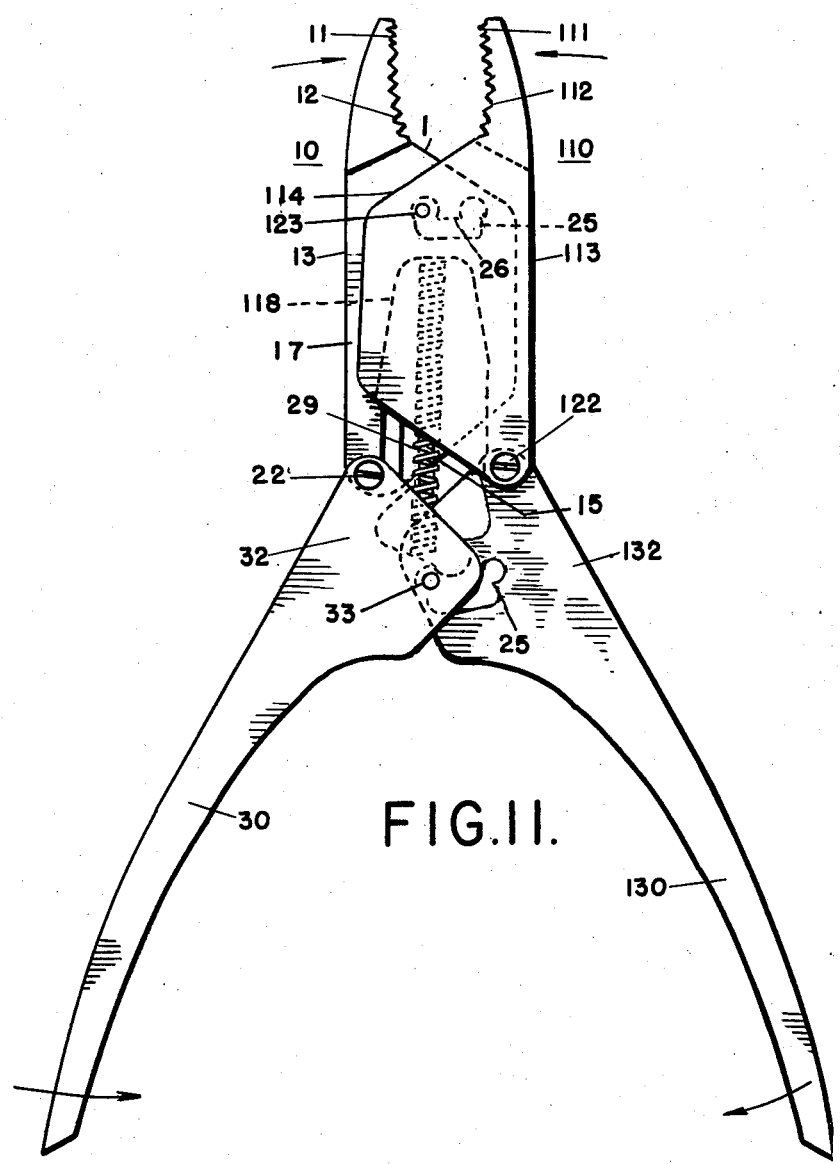
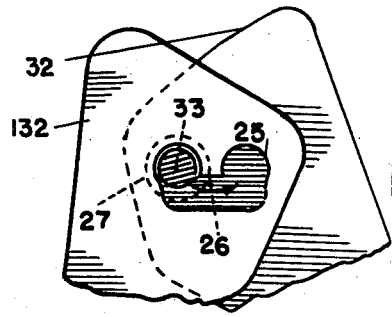

United States Patent Office 2,857,795
Patented Oct. 28, 1958

2,857,795

ADJUSTABLE PLIERS

Paul Workman, Baltimore, Md.

Application March 3, 1955, Serial No. 491,860

10 Claims. (Cl. 81—351)

This invention relates to tools of a mechanical nature and more particularly to those of the pliers, clamp and wrench classes, and has for an object the provision of a new and improved tool of this nature that will avoid one or more of the disadvantages and limitations of the prior art.

Another object of this invention is to provide a new and improved toggle pliers that will have jaws capable of adjustment to suit a variety of sizes of articles to be clamped or held, without lessening their ability to clamp the said articles securely, and to release them when required, without changing the adjustment.

A further object of the invention is to provide new and improved toggle pliers that will have a plurality of adjustments that can be rigidly set to suit various sizes of articles, such as nuts, pipe, screws and assembled parts, and hold them rigidly when the handles are closed together.

An additional object of this invention is to provide new and improved toggling pliers of considerable leverage, applicable in a limited space, with their jaws adapted to operate in quasi-parallel relation to each other through a minimum amount of spacing in excess of the periphery of the article to be grasped.

Other objects reside in the combinations of elements, arrangements of parts and structural design, as will be apparent in the accompanying drawings and description of preferred forms of the invention.

While pliers, wrenches and clamps have been extensively developed and intended to have similar functions, the particular structural difference is in the handle mechanism for manipulating them. Pliers usually have a pair of handles, adapted to be brought together to force their jaws against the selected surfaces of an article or conversely released therefrom. This invention is in this category. One of the objections generally noted in toggling pliers is that the jaws are operated as outside elements having no provision to maintain their alignment. In this invention the toggling jaws are arranged to slide against each other and afford positive guidance in their movement to keep them aligned. This is especially valuable in the clamping of an article as it holds the latter more securely and lessens the chances for slipping and marring of its surfaces. Likewise the handle elements of the pliers are guided. In both instances adjustments are readily made without danger of the adjusted parts slipping therefrom. In addition these parts are securely bolted in place to maintain such adjustments. Adjustment of jaws is provided for in many commonly used pliers, but in most cases it will not maintain the adjusted position during practical use, because the adjustment has no means that lock it securely. There is also a common tendency for tools in the form of pliers to nip the hand or fingers of the user between their operational elements and thereby causing injury. This is avoided in this invention by constructing the parts without close-joining connections that can open enough to bite the user, when they are actuated.

In the drawings:

Figure 3 is a front elevation of one of the jaw members, with dotted lines indicating the recess and spring on the opposite side, used for tensioning the components of the pliers;

Figure 4 is an elevation of the other jaw member of the pliers looking at its inside face;

Figure 5 is a side elevation of Figure 3;

Figure 6 is an outside elevation of a handle element;

Figure 7 is the elevation of the other handle element looking at its inside face;

Figure 8 is a side elevation of Figure 6;

Figure 9 is a side elevation of Figure 7;

Figure 11 is a modified form of the pliers; and

Figure 12 is a detail partly in section, showing the adjustable pivot arrangement used in the form shown in Figure 11.

Similar reference characters refer to similar parts throughout the drawings.

Figures 1, 2, 10:
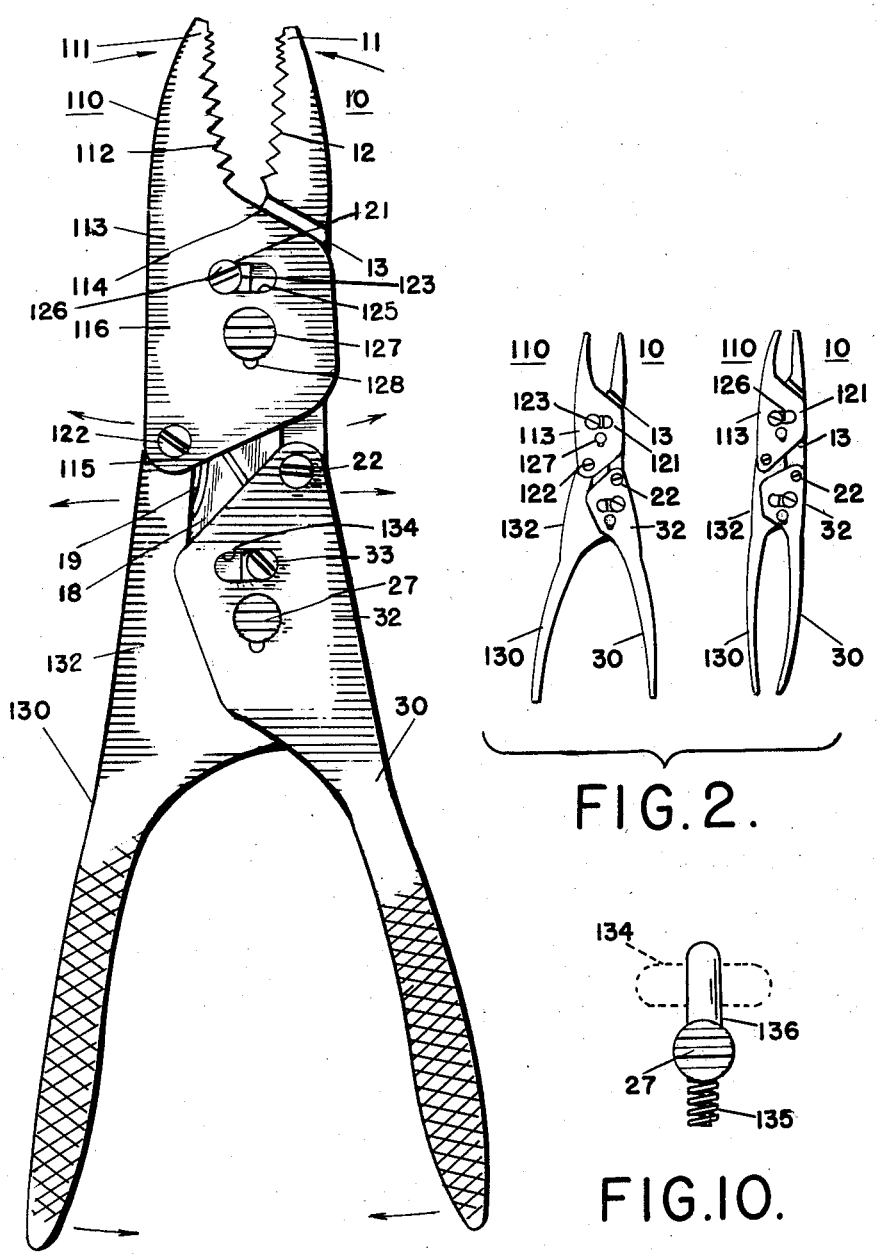
Figure 1 is a front view of toggling pliers embodying this invention.
Figure 2 is a diagrammatic sketch of the pliers shown in this embodiment, in open and closed positions, adjusted selectively.
Figure 10 is a detail of the bolt and pivot mechanism used in this embodiment.

In the construction shown in the drawings, particularly in Figure 1, toggling pliers consist of four main components, there being two jaw members somewhat symmetrical in contour and two handle members likewise symmetrical in appearance.

Jaw members

The jaw members are termed right and left arbitrarily to make their identification easier to follow. The right member is that on the right of Figure 1 and the left member to the left. The right member is designated by the reference character 10, and has a jaw with teeth 11 near its terminus, and with the lower teeth 12 larger and further inward. Both sets of teeth are V-shaped and are of the typical kind included on conventional pliers. A body 13 depends from the jaw and is flat. It is about half the thickness of the jaw and of polygonal or quadrilateral contour with its upper border 14 slanting towards its lower border 15 which slants towards it. Its other two borders are substantially parallel and merge into the arcuate side of the jaw and border 14 as indicated in the drawings, especially in Figure 1 and Figure 3. The exterior face 16 of the body is flat. The interior face 17 is also flat but in addition has a sunken recess 18 that is also flat and extends over a large part of its area to serve as an operating space for a jaw tensioning wire spring 19 to retract and expand in during the working of the pliers. A hole 20 in the lower corner of the body 13 serves to receive a hinge pin 22 that is screwed through it. Another hole 21 in the upper area of the body is screw threaded and receives the screw threaded end of a pivot stud 123.

The left jaw member 110 has a jaw with teeth 111 and 112 to correspond with those in the jaw 10 and face them. The body 113 is likewise generally symmetrical having an upper border 114, lower border 115, a sunken recess 118 and a corner hinge hole 120. In addition it has a horizontal slot 121 alignable with the hole 21 but considerably larger longitudinally than the diameter of the former. The pivot stud 123 although stationary in body 13 can be moved sidewise along the horizontal slot 121 at either end. A bolt 126 is slidable vertically in a slot 125 in body 113 and across the middle of slot 121 thus holding the stud 123 at the end of the slot 121 that it is in at the time. The sliding bolt 126 is kept tensioned in position by a wire spring 119 suitably anchored in the recess 118. The spring 119 permits the bolt to be pulled down by a button 127 mounted on it exteriorly, and when released to return and close off the slot 121 at the middle. A corner hinge hole 120 is arranged in the lower corner of the body 113 as indicated. This hole receives the hinge pin 122.

Handle elements

The jaw members are connected to handle elements that in their operation open and close the jaws. The handle element 30 on the right is connected with the jaw member 10 on the right, and handle element 130 on the left with the jaw member 110, by the hinge pins 22 and 122 respectively. These pins pass through hinge holes 31 and 131 in the heads 32 and 132 of the handle elements 30 and 130 respectively. The handle heads 32 and 132 have their upper borders 38 and 138 slanted like the lower borders 15 and 115, and are provided with sunken triangular recesses 39 and 139. These recesses are employed to facilitate the resilient tensioning effect of the spring 19, after assembly.

The handle elements are pivoted together through the use of a pivot stud 33 passing through an elongated slot 134 in the head 32 and into a threaded hole 34 in the head 132 aligned with the slot 134. This slot 134 is separable in the middle by a resilient bolt 136 slidable across it, as in the bolt mechanism already described, and referred to, in the jaw members to space them. A button 27 is mounted on the bolt and operates when the pivot pin is selectively located. A coil spring 135 tensions the bolt and is installed in the vertical slot in which the bolt 136 reciprocates.

The handles as mentioned are pivoted to one another by the pivot stud 33 movable in a horizontal slot 134. The stud is screwed stationarily in the head 132 and by reason of the bolt 136 may be slid with the head 32 holding it and placed in either end of the slot 134. This gives two pivot positions for the handles to fulcrum on. The bolt 136 slides up and down in the vertical slot and is tensioned upwardly by the spring 135 fastened in the recess. The bolt 136 partitions the slot 134 into two compartments, either of which can be utilized to hold the screw 33 positioned in the selected parts of the heads 32 and 132. The button 27 fastened to the bolt 136 is pressed up and down to actuate it. The handles are preferably knurled for facile handling.

In Figure 11, the modified form of pliers is in general made like that of the first embodiment. However the spring 29 is of coil form and mounted on a telescopic post, in the recesses, formed on the inner surfaces of the jaw bodies. This spring gives tension to the pliers and forces the handles and jaws to normally keep open or apart. This is in place of the spring 19 used in the first embodiment. In addition the pivot adjustment of the jaws and handles is provided for by the horizontal double looped slot 25 in the jaw member 110 which by reason of its form does not require a bolt, as the intermediate tongue 26 takes its place. Since the whole device is under the tension of the spring 29, the pivot screws will not slip out of place, until forcibly made to do so.

In the operation of the pliers, the inward pressure exerted by the user on the handles 30 and 130 causes a pivotal swing on the lower pivot screw and under leverage it brings the heads 32 and 132 outwardly. This leverage is transmitted to the screws 22 and 122 and forces the bodies 13 and 113 inwardly pivoting on the upper screw. This brings the jaws inwardly, in toggle action. The pivot screws are varied in position in their respective slots to suit the work to be handled by the pliers and when set they will not slip out of adjustment.

In the formation of the jaws, the need for teeth is not essential in all uses. In some cases it is preferable to dispense with them, and for this reason they are not shown in the diagrams of Figure 2. In another instance the angle of the terminating portions, as at 11, and 111, can be varied, either on one side or both, especially where the position of the fulcrum makes this desirable.

While but two forms of the invention have been indicated in the drawings and described herein, it is not desired to limit this application for patent to such particular forms as it is appreciated that other constructions could be designed and made that would use the same principles and come within the scope of the appended claims.

Having thus described the invention, what is claimed is:

1. Improved toggling pliers comprising a pair of jaws, pivot means between said jaws including a pin carried by one of said jaws and an elongated slot in the other of said jaws whereby said pin is adjustable in two opposite positions in said slot, means for maintaining the pin in either of said opposite positions, a pair of handles each having a portion pivoted to each of the jaws, and additional pivot means between said handles, said last-named means including a pin carried by one of said handles and an elongated slot in the other of said handles whereby the last-named pin is adjustable in two opposite positions in said last-named slot, and means for maintaining said last-named pin in either of said opposite positions.

2. The improved toggling pliers set forth in claim 1 wherein the aforesaid means for maintaining the pins in either of said opposite positions comprise bolts slidable medially and athwart the slots in which the pins are adjustable.

3. The improved toggling pliers set forth in claim 1 wherein the aforesaid means for maintaining the pins in either of said opposite positions comprise internal locking surfaces in the slots in which the pins are adjustable.

4. The improved toggling pliers set forth in claim 1 including a spring carried by the pliers to normally resist closing movement of the jaws.

5. The improved toggling pliers set forth in claim 4, said spring being anchored at one end to one of the jaws and having a free end abutting one of the handles.

6. Improved toggling pliers comprising a pair of jaws, pivot means between said jaws including a pin carried by one of said jaws and an elongated slot in the other of said jaws whereby said pin is adjustable in two opposite positions in said slot, means including internal locking surfaces in the slots in which the pins are adjustable for maintaining the pin in either of said opposite positions, a pair of handles each having a portion pivoted to each of the jaws, and additional pivot means between said handles, said last-named means including a pin carried by one of said handles and an elongated slot in the other of said handles whereby the last-named pin is adjustable in two opposite positions in said last-named slot, means including internal locking surfaces in said last-named slot for maintaining said last-named pin in either of said opposite positions, and a helical spring having one end abutting one of the jaws and the opposite end abutting one of the handles, said spring normally opposing closing movement of the jaws when the handles are manipulated.

7. Improved toggling pliers comprising a pair of jaws, pivot means between said jaws including a pin carried by one of said jaws and an elongated slot in the other of said jaws whereby said pin is adjustable in two opposite positions in said slot, a bolt slidable medially and athwart said slot, a spring urging said bolt to cross said slot, means on said bolt to withdraw the same against spring pressure to allow passage of said pin from one position of adjustment to the opposite position, a pair of handles each having a portion pivoted to each of the jaws, and additional pivot means between said handles, said last-named means including a pin carried by one of said handles and an elongated slot in the other of said handles whereby the last-named pin is adjustable in two opposite positions in said last-named slot, a second bolt slidable medially and athwart said last-named slot, a spring urging said second bolt to cross said slot and means on said second bolt to withdraw the same against spring pressure to allow passage of said last-named pin from one position of adjustment to the opposite position.

8. Improved pliers comprising a pair of jaws adapted to work against one another for grasping an article, each of said jaws including a flattened body portion, at least one of said body portions having a recess formed in the surface thereof facing the other of said body portions upon assembly, each of said jaws having a jaw member formed integrally with and extending forwardly from said body, adjustable pivot means for securing said jaws in working relationship, said pivot means located on said body portions proximate said jaw members, a pair of handles, each of said handles including flattened head members formed at the forward ends thereof, said head members being pivotally joined to the rearward portions of said jaw bodies, at least one of said head members having a recess formed in the surface thereof facing the other of said head members upon assembly, adjustable pivot means on said head members for securing said handles to one another, and spring means carried in the recesses of said jaw body and said head member and bearing on said jaw bodies and said head members for biasing said jaw members toward an open position.

9. Pliers as claimed in claim 7 wherein said first and second named adjustable pivot means comprises a pin carried by one of the members being joined and an elongated slot in the other of the members being joined, said pin being adjustable in two opposite positions in said slot, and a bolt slidable medially and athwart said slot for maintaining said pin in one of the other of said opposite positions of adjustment.

10. Pliers as claimed in claim 7 wherein said first and second named adjustable pivot means comprises a pin carried by one of the members being joined, an elongated slot formed in the other member being joined, said slot having looped end portions and a tongue depending from said other member within said slot so as to separate partially said looped end portions.

References Cited in the file of this patent

UNITED STATES PATENTS

| 276,417 | Jencks | Apr. 24, 1883 |
| 791,245 | Casterlin | May 30, 1905 |
| 1,763,527 | Jones | June 10, 1930 |
| 2,501,238 | Sarsgard et al. | Mar. 21, 1950 |

FOREIGN PATENTS

| 411,000 | Germany | Mar. 9, 1925 |